United States Patent
Komulainen et al.

(10) Patent No.: US 10,004,048 B2
(45) Date of Patent: Jun. 19, 2018

(54) TRANSMISSION POWER CONTROL METHODS AND DEVICES

(71) Applicant: Intel Corporation, Santa Clara, CA (US)

(72) Inventors: Mikko Komulainen, Tampere (FI); Saku Lahti, Tampere (FI); Petri T. Mustonen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/088,496

(22) Filed: Apr. 1, 2016

(65) Prior Publication Data

US 2017/0289929 A1 Oct. 5, 2017

(51) Int. Cl.
*H04W 52/38* (2009.01)
*G01V 3/08* (2006.01)

(52) U.S. Cl.
CPC ............. *H04W 52/38* (2013.01); *G01V 3/08* (2013.01)

(58) Field of Classification Search
CPC .......................... H04W 52/367; H04W 52/283
See application file for complete search history.

(56) References Cited

U.S. PATENT DOCUMENTS

| | | | |
|---|---|---|---|
| 8,077,032 B1 | 12/2011 | Vier et al. | |
| 8,682,949 B2* | 3/2014 | Matsushima | G06F 3/044 708/400 |
| 8,775,103 B1* | 7/2014 | Jayaraj | H03K 17/955 702/57 |
| 9,253,733 B1* | 2/2016 | Lee | H04W 52/283 |
| 2007/0109274 A1* | 5/2007 | Reynolds | G06F 3/041 345/173 |
| 2008/0265914 A1* | 10/2008 | Matsushima | H03K 17/962 324/686 |
| 2012/0208478 A1 | 8/2012 | Greenwood et al. | |
| 2014/0171141 A1 | 6/2014 | Niskala | |
| 2014/0315592 A1* | 10/2014 | Schlub | H04B 1/3838 455/522 |
| 2015/0048927 A1* | 2/2015 | Simmons | G07C 9/00309 340/5.61 |
| 2015/0234077 A1* | 8/2015 | Komulainen | G01V 3/12 324/629 |
| 2016/0365886 A1* | 12/2016 | Prendergast | H04B 1/3838 |
| 2016/0370487 A1* | 12/2016 | Komulainen | G01V 3/12 |
| 2017/0090599 A1* | 3/2017 | Kuboyama | G06F 3/038 |

OTHER PUBLICATIONS

Search Report dated May 18, 2017 for International Application No. PCT/US2017/020939.

* cited by examiner

*Primary Examiner* — Bobbak Safaipour
(74) *Attorney, Agent, or Firm* — Schiff Hardin LLP

(57) ABSTRACT

Transmission power control methods and devices are described. In a transmission power control method, a triggering distance can be calculated based on one or more communication parameters. Using a proximity sensor, a proximity distance of the communication device with an external object can be calculated. The triggering distance and the proximity distance can be compared, and based on this comparison, a transmission power mode of the communication device can be determined and set.

17 Claims, 7 Drawing Sheets

TRANSMISSION POWER CONTROL METHODS AND DEVICES

BACKGROUND

Field

Aspects described herein generally relate to transmission power control for wireless communications, including controlling transmission power based on the proximity of a wireless communication device to an object such as a user.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 3:
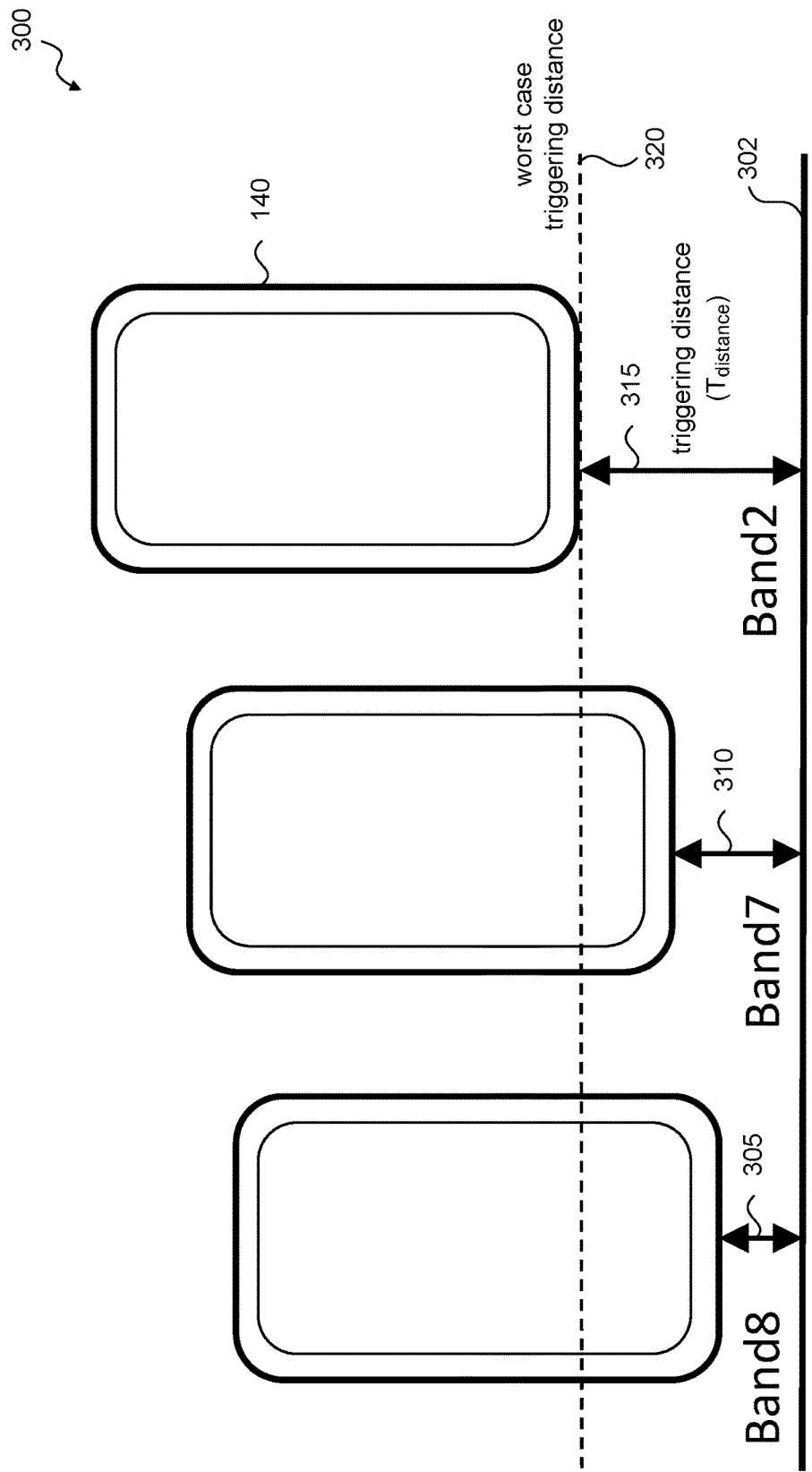
FIG. 3 illustrates example triggering distances of a mobile device according to exemplary aspects of the present disclosure.

As an overview, a specific absorption rate (SAR) is standardized quantity (with unit W/Kg) for measuring absorption of radio frequency (RF) power to human tissue. With radio devices, such as wireless communication devices, SAR limits have been established by various regulatory agencies, including the Federal Communication Commission (FCC) and European Telecommunications Standards Institute (ETSI). To comply with these SAR limits, wireless communication devices can adjust the transmission power of their wireless communications. In exemplary aspects described below, a communication device (e.g., a mobile device) is configured to adjust a transmission power of its wireless communications based on a proximity of one or more objects (e.g., the user of the mobile device) to the communication device. As illustrated in FIG. 3, the adjustment of the transmission power can be based on a triggering distance ($T_{distance}$), which can depend on one or more wireless communication parameters of the mobile device. The communication parameters can include, for example, the wireless band, wireless channel, radio access technology (RAT), modulation scheme, or one or more other parameters as would be understood by those skilled in the art.

Figure 1:
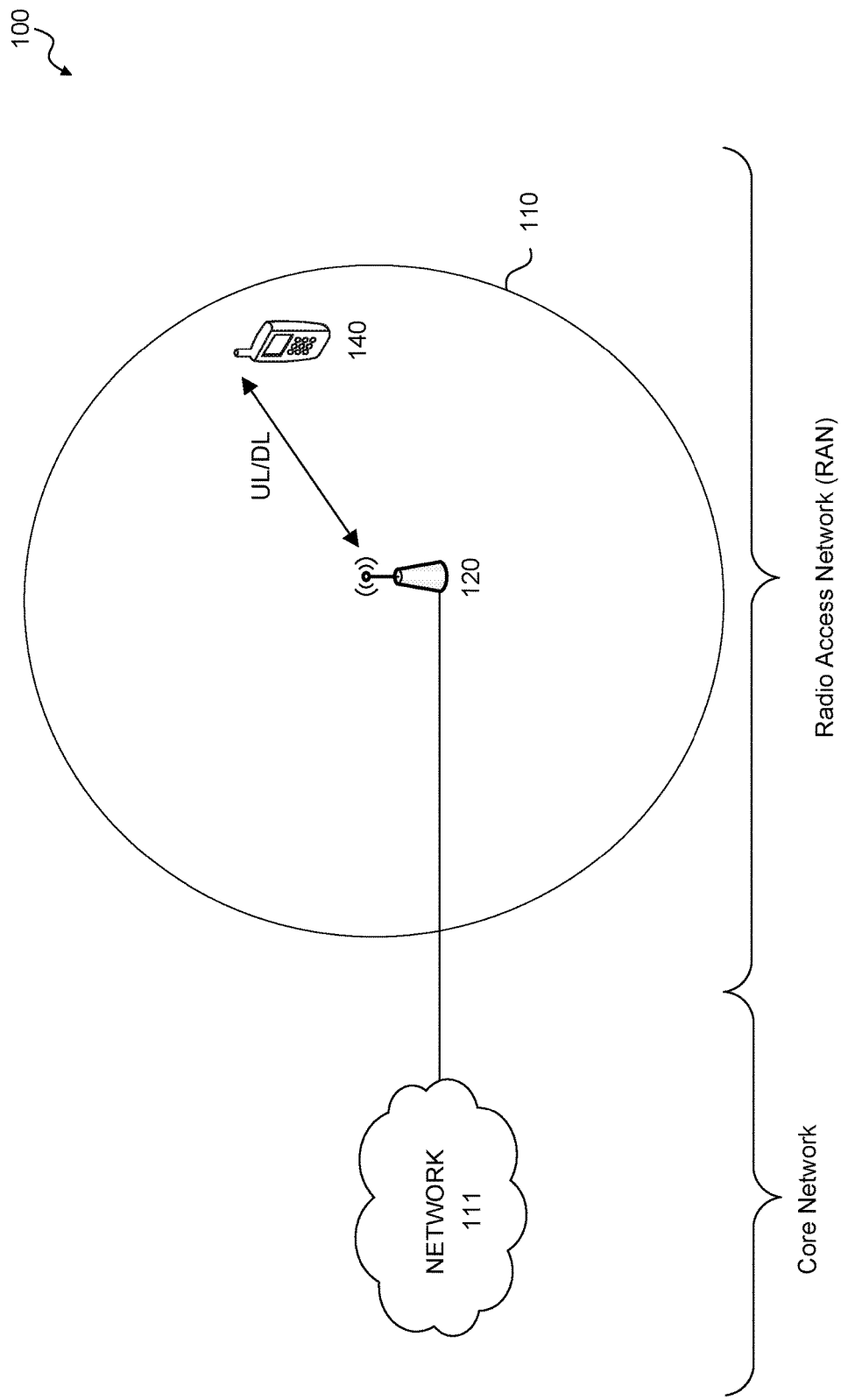
FIG. 1 illustrates an example network environment.

FIG. 1 illustrates an example communication environment 100 that includes a radio access network (RAN) and a core network. The RAN includes one or more base stations 120 and one or more mobile devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. In an exemplary aspect, the backhaul communication network is an internet protocol (IP) backhaul network.

The number of base stations 120, mobile devices 140, and/or networks 111 are not limited to the exemplary quantities illustrated in FIG. 1, and the communication environment 100 can include any number of the various components as would be understood by one of ordinary skill in the relevant art(s). In an exemplary aspect, the base station 120 and mobile device 140 each include processor circuitry that is configured to communicate via one or more wireless technologies.

The mobile device 140 and the base station 120 can each include a transceiver configured to transmit and/or receive wireless communications via one or more wireless technologies within the communication environment 100. In operation, the mobile device 140 can be configured to communicate with the base station 120 in a serving cell or sector 110 of the communication environment 100. For example, the mobile device 140 receives signals on one or more downlink (DL) channels from the base station 120, and transmits signals to the base station 120 on one or more respective uplink (UL) channels.

A transceiver can include one or more transmitters and one or more receivers that configured to transmit and receive wireless communications, respectively, via one or more antennas. Those skilled in the relevant art(s) will recognize that the transceiver(s) can also include (but are not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device— such as a computerized wrist watch or "smart" watch, and computerized eyeglasses. In some aspects of the present disclosure, the mobile device 140 may be a stationary communication device, including, for example, a stationary computing device—such as a personal computer (PC), a desktop computer, a computerized kiosk, and an automotive/aeronautical/maritime in-dash computer terminal.

Figure 2:
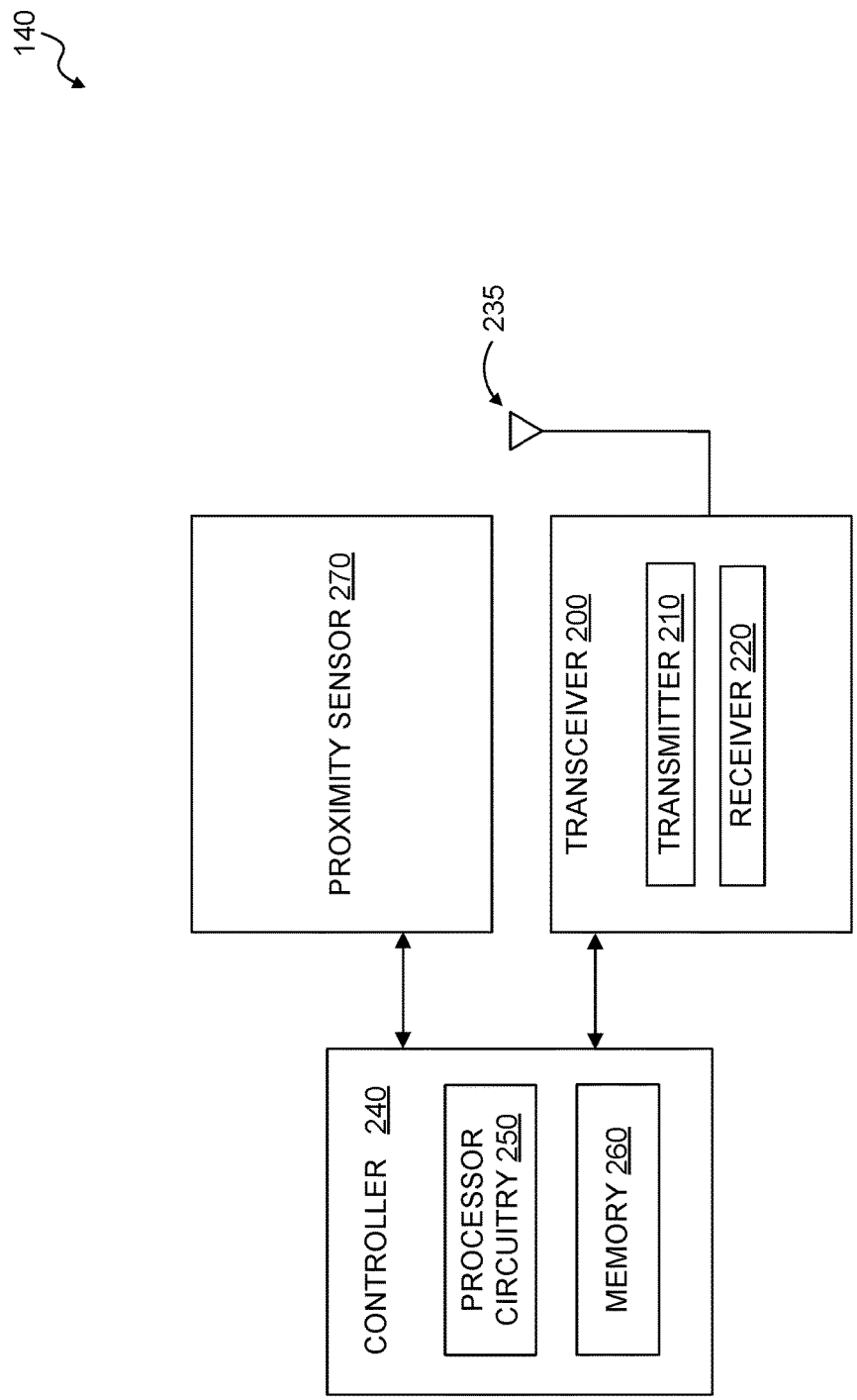
FIG. 2 illustrates a mobile device according to an exemplary aspect of the present disclosure.

FIG. 2 illustrates the mobile device 140 according to an exemplary aspect of the present disclosure. The mobile device 140 can include controller 240 communicatively coupled to one or more transceivers 200 and one or more proximity sensors 270. The transceiver(s) can be configured to transmit and/or receive wireless communications via one or more wireless technologies within the communication environment 100. The proximity sensor(s) 270 can be configured to detect the proximity of one or more objects to the mobile device 140. For example, the proximity sensor 270 can detect the distance the mobile device 140 is to a user of the mobile device 140.

The transceiver 200 can include processor circuitry that is configured for transmitting and/or receiving wireless communications conforming to one or more wireless protocols. For example, the transceiver 200 can include a transmitter 210 and a receiver 220 configured for transmitting and receiving wireless communications, respectively, via one or more antennas 235.

In exemplary aspects, the transceiver 200 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 235 may include an integer array of antennas, and that the antennas may be capable of both transmitting and receiving wireless communication signals.

The controller 240 can include processor circuitry 250 that is configured to control the overall operation of the mobile device 140, such as the operation of the proximity sensor 270 and/or transceiver 200. The processor circuitry 250 can be configured to, for example: adjust one or more parameters of the proximity sensor 270; control the proximity sensor 270 to determine a distance to an object (e.g., user); control the transmitting and/or receiving of wireless communications via the transceiver 200; and/or perform one or more baseband processing functions (e.g., media access control (MAC), encoding/decoding, modulation/demodulation, data symbol mapping; error correction, etc.). The processor circuitry 250 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 240 can include one or more elements of a protocol stack such as, a physical (PHY) layer, media access control (MAC), radio link control (RLC), packet data convergence protocol (PDCP), and/or radio resource control (RRC) elements.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

The proximity sensor 270 can include processor circuitry that is configured to detect the proximity of one or more objects to the mobile device 140. For example, the processor circuitry of the proximity sensor 270 can be configured to detect the distance the mobile device 140 is to an object (e.g., user of the mobile device 140) and to generate proximity information corresponding to the detected distance. In an exemplary aspect, the proximity sensor 270 can be configured to calculate a proximity distance ($P_{distance}$) that corresponds to the distance between the mobile device 140 and one or more objects (e.g., the user of the mobile device 140). In other aspects, the controller 240 can calculate the proximity distance ($P_{distance}$) based on proximity information provided to the controller 240 by the proximity sensor 270.

The proximity sensor 270 can also be configured to operate in a reduced (e.g., low) power operating mode when not being used by the mobile device 140. In an exemplary aspect, when operating in the reduced power operating mode, the proximity sensor 270 or one or more components of the proximity sensor 270 can, for example, reduce its power consumption or power off. The proximity sensor 270 can be configured to enter and operate in the reduce power operating mode after being idle for a predetermined amount of time and/or in response to one or more control signals generated by the controller 240.

The proximity sensor 270 can be a capacitance proximity sensor configured to detect the proximity of one or more objects to the mobile device 140 based on a detected capacitance (see FIGS. 4A-4B), but is not limited thereto. For example, the proximity sensor 270 can be an infrared proximity sensor that measures an infrared value. In other aspects, the proximity sensor 270 can be configured to measure heat, light, sound, inductance, resistance, and/or another environmental value as would be understood by one of ordinary skill in the art to measure the proximity of one or more objects.

In an exemplary aspect, the controller 240 can be configured to adjust a transmission power of the mobile device 140 based on the detected proximity of the proximity sensor 270. In this example, the controller 240 can adjust the transmission power at which the transceiver 200 (i.e., the transmitter 210) wirelessly transmits.

In operation, the proximity of the mobile device 140 to the absorbing object (e.g., the user of the mobile device) impacts the specific absorption rate (SAR) of radio frequency (RF) power to the absorbing object. For example, a communication device that is closer to the object will have a higher SAR than a communication device at a farther distance from the object when operating at the same transmission power. Therefore, in an exemplary aspect, the transmission power can be adjusted based on the proximity of the mobile device 140 to the object to comply with regulated SAR limits.

In an exemplary aspect, the mobile device 140 can adjust the transmission power at which the transceiver 200 wirelessly transmits based on the proximity of the mobile device 140 to the absorbing object (e.g., the user of the mobile device). In addition to the proximity of the mobile device 140 to the object, the SAR may depend on wireless communication parameters of the mobile device 140, such as the wireless band at which the mobile device 140 is operating, the wireless channel, the radio access technology (RAT) being used, the modulation scheme, or one or more other parameters as would be understood by those skilled in the art.

In an exemplary aspect, as illustrated in FIG. 3, the mobile device 140 can be configured to adjust the transmission power based on a triggering distance ($T_{distance}$) 305, 310, 315 with respect to the object 302 (e.g., user of the mobile device 140). In this example, the triggering distance is dependent on the wireless band at which the mobile device 140 is operating. When operating at, for example, Long-term Evolution (LTE) bands 8, 7, and 2, the mobile device 140 can be configured to adjust the transmission power at triggering distances 305, 310, and 315, respectively. In an exemplary aspect, to comply with the SAR limits, the mobile device 140 can be configured to set the triggering distance at which to adjust the transmission power to the worst case triggering distance 320. For example, because LTE Band 2 requires a reduction in transmission power at a larger trigging distance 315 than that for Bands 7 and 8, the triggering distance can be set at the worst case triggering distance 320 for all Bands. In this example, the mobile device 140 can adjust the transmission power based on the proximity to the object 302 irrespective of the Band at which the mobile device 140 is operating.

In an exemplary aspect, to improve the performance of the mobile device 140, the mobile device 140 can be configured to adjust the transmission power based on the proximity of the mobile device 140 with the object 302 and on one or more wireless communication parameters of the mobile device 140. For example, when operating at Band 8, the mobile device 140 can be configured to adjust the transmission power based on triggering distance 305 while adjusting the transmission power based on triggering distances 310 and 315 when operating at Bands 7 and 2, respectively. In this example, the mobile device 140 can operate at a normal transmission power until the proximity of the mobile device 140 is within the corresponding triggering distance for the particular Band (and/or other wireless parameter).

For example, when the mobile device 140 detects that the distance between the mobile device 140 and the object 302 is less than the triggering distance 305, the mobile device 140 can be configured to reduce the transmission power of the mobile device 140, thereby lowering the SAR of the mobile device 140 to the regulated SAR limit. Similarly, when the mobile device 140 detects that the distance between the mobile device 140 and the object 302 is less than the triggering distance 310 when operating using Band 7, the mobile device 140 can reduce the transmission power of the mobile device 140 to comply with the regulated SAR limit. In this exemplary aspect, the wireless performance of the mobile device 140 is improved because the mobile device 140 is not unnecessarily reducing its transmission power when compared to the example where the mobile device 140 adjusts the transmission power at a worst case triggering distance 320.

With continued reference to FIGS. 2 and 3, in an exemplary aspect, the controller 240 can be configured to calculate the triggering distance ($T_{distance}$) based on one or more wireless communication parameters, including, for example, the wireless band at which the mobile device 140 is operating, the wireless channel, the radio access technology (RAT) being used, the modulation scheme, or one or more other parameters as would be understood by those skilled in the art.

The controller 240 can be configured to calculate a proximity distance ($P_{distance}$) to an object based on proximity information provided by the proximity sensor 270, or can be configured to process a proximity distance ($P_{distance}$) provided by the proximity sensor 270 in configurations where the proximity sensor 270 calculates the proximity distance ($P_{distance}$). The controller 240 can be configured to compare the proximity distance ($P_{distance}$) to the triggering distance ($T_{distance}$) calculated by the controller 240. Based on this comparison, the controller 240 can adjust the transmission power of the mobile device 140.

For example, if the controller 240 determines that the proximity distance ($P_{distance}$) is less than the triggering distance ($T_{distance}$), the controller 240 can reduce the transmission power of the mobile device 140 so as to operate in a reduced transmit power mode. If the controller 240 determines that the proximity distance ($P_{distance}$) is greater than the triggering distance ($T_{distance}$), the controller 240 can increase the transmission power of the mobile device 140 to a normal transmission power level so as to operate in a normal transmit power mode. In this example, the mobile device 140 is configured to restrict the transmission power when the proximity of the mobile device 140 is within the triggering distance so as to comply with the SAR limits. Example reduced and normal transmission power values for various wireless communications are illustrated below in Table 1. In an exemplary aspect, these values are the maximum transmission power values.

TABLE 1

| Mode | Sensor State | WCDMA8 | WCDMA | LTE4 | LTE7 |
| --- | --- | --- | --- | --- | --- |
| Normal transmit Power | Far | 24 dBm | 24 dBm | 23.5 dBm | 23.5 dBm |
| Reduced transmit Power | Near | 18 dBm | 15 dBm | 16 dBm | 16 dBm |

Figure 4A:
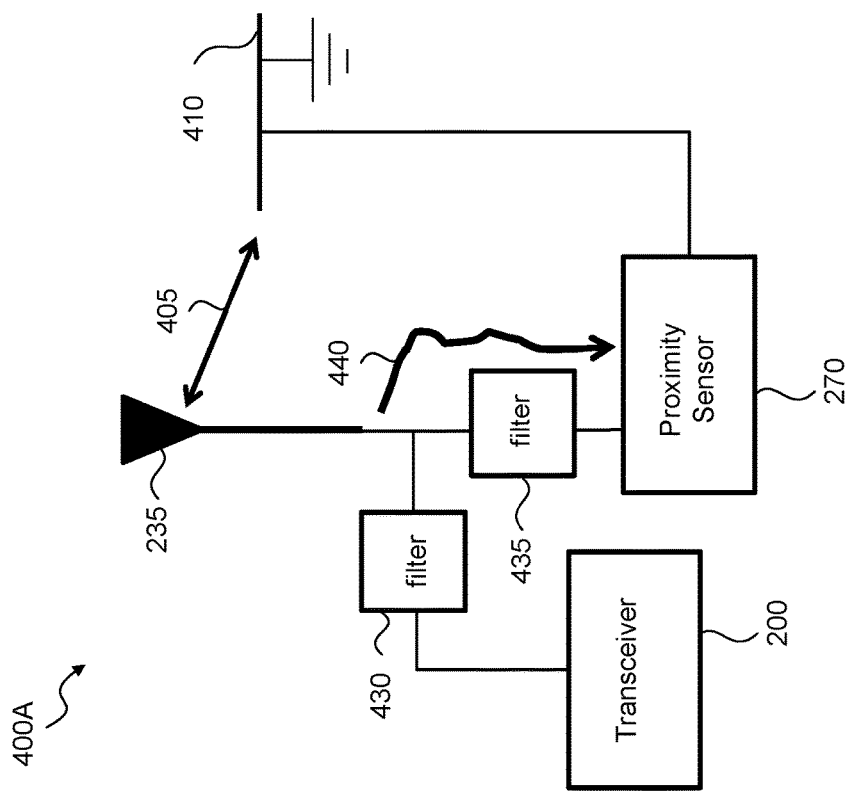
Figure 5:
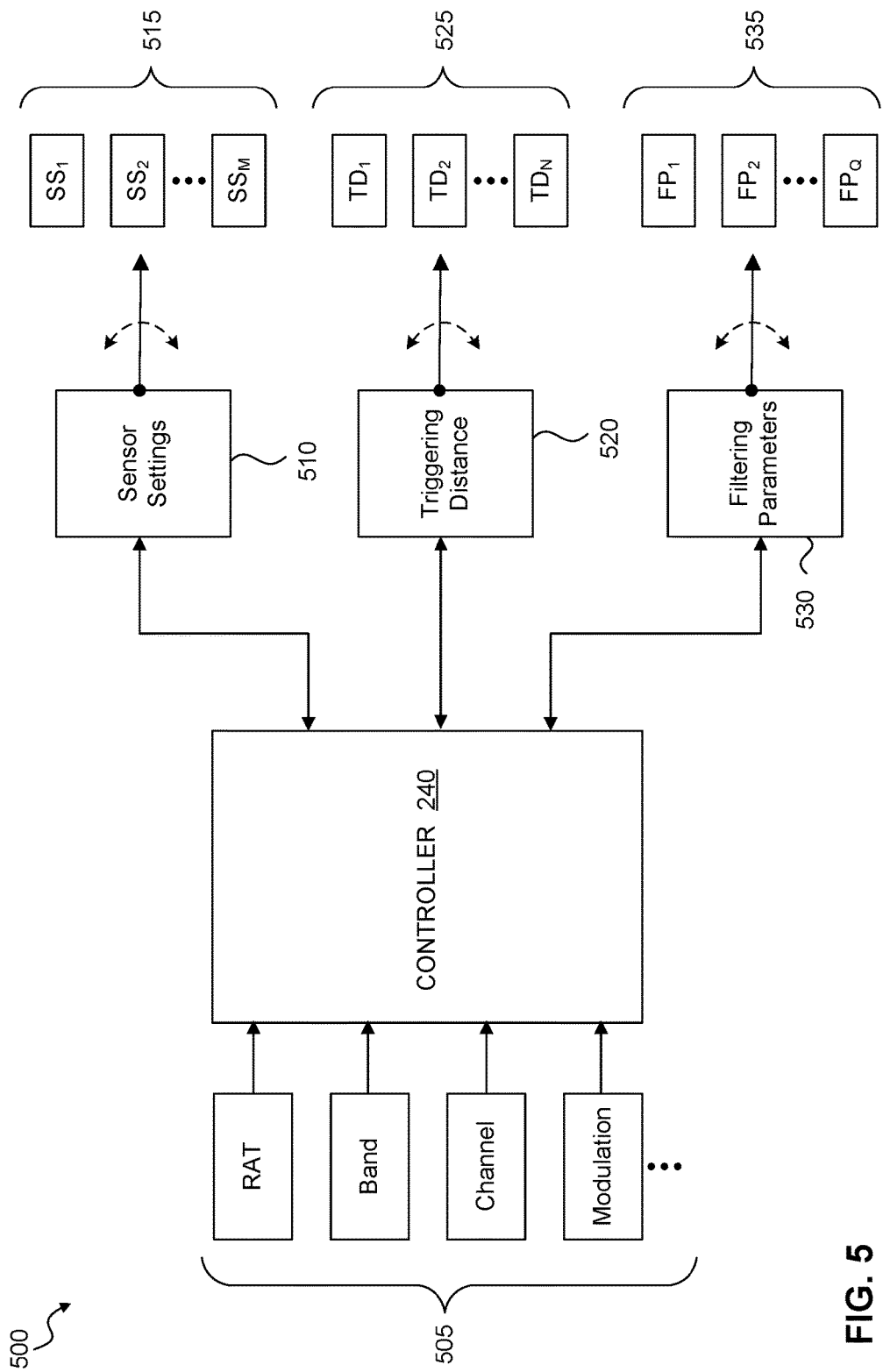
FIG. 5 illustrates a mobile device according to an exemplary aspect of the present disclosure.

With reference to FIG. 5, the controller 240 can be configured to calculate the triggering distance ($T_{distance}$) 520, one or more sensor settings and/or parameters 510 of the proximity sensor 270, and/or one or more filter settings and/or parameters 530 of one or more filters (e.g., filters 430, 435 in FIG. 4A) and/or digital signal processing (DSP) filtering related parameters of proximity sensor 270. The calculations can be based on one or more wireless communication parameters 505, including, for example, the wireless band at which the mobile device 140 is operating, the wireless channel, the radio access technology (RAT) being used, the modulation scheme, or one or more other parameters as would be understood by those skilled in the art.

In operation, the sensor settings and/or parameters 510 can be selected from one or more settings/parameters 515, including, for example, one or more sensitivity settings, sampling rates, noise filtering settings, and/or one or more other sensor settings/parameters as would be understood by one of ordinary skill in the relevant arts. The triggering distance 520 can be selected from one or more triggering distances 525. The filter settings and/or parameters 530 can be selected from one or more settings/parameters 535, including, for example, one or more filter-mode settings (e.g., low-pass, high-pass, band-pass, band-stop, comb, notch, etc.), frequency value and/or ranges, transfer functions, DSP filtering related parameters of the proximity sensor 270, and/or one or more other filter settings/parameters as would be understood by one of ordinary skill in the relevant arts. In an exemplary aspect, the sensor settings/ parameters 515, triggering distances 525, and/or filter settings/parameters 535 can be determined through one or more calibration procedures.

Figure 4B:
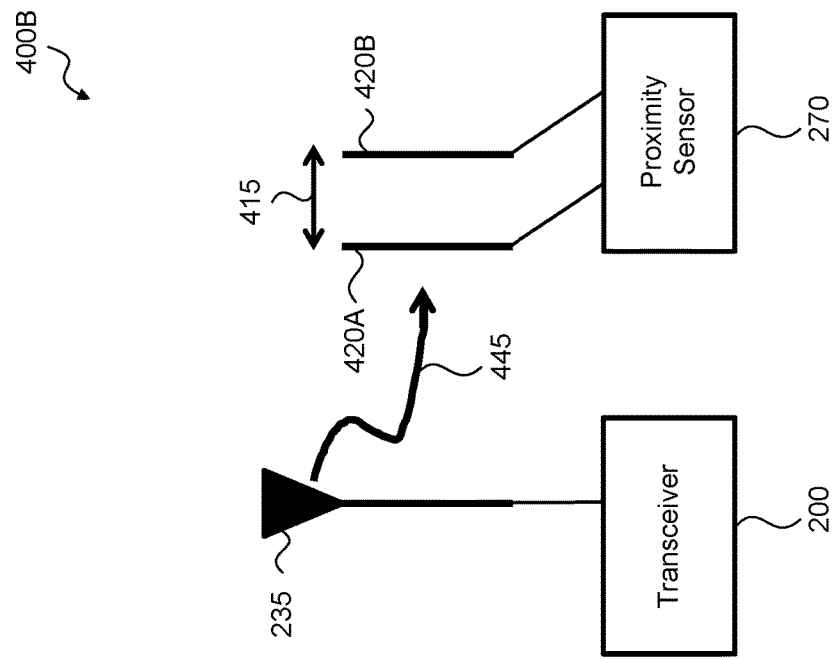
FIG. 4A-4B illustrate proximity sensor arrangements according to exemplary aspects of the present disclosure.

Turning to FIGS. 4A and 4B, exemplary capacitance proximity sensor arrangements are illustrated. In FIG. 4A, the proximity sensor 270 is a capacitance proximity sensor configured to detect a capacitance 405 between antenna 235 and a ground plane 410 within the mobile device 140. In this example, the proximity sensor 270 is connected to the antenna 235 via filter 435, and the transceiver 200 is connected to the antenna 235 via filter 430. The filters 430 and/or 435 can include, for example, one or more capacitors, inductors, resistors, and/or one or more active filtering components.

The filter 435 can be configured to filter one or more signals and/or signal components present on the connection between the transceiver 200 and the antenna 225, and/or one or more signals received by the antenna 235. The filter 435 can be configured to filter one or more RF signals. In operation, the filter 435 may be unable to filter one or more RF signals 440, which can impact the performance of the proximity sensor 270. To reduce the impact on the proximity sensor, the controller 240 can be configured to select and/or adjust one or more sensor settings and/or parameters 510 of the proximity sensor 270, and/or one or more filter settings and/or parameters 530 as described with reference to FIG. 5.

In FIG. 4B, the proximity sensor 270 is a capacitance proximity sensor configured to detect a capacitance 415 between two or more sensor plates 420A, 420B within or a part of the mobile device 140. In operation, the one or more RF signals 445 from the antenna 235 may be coupled to the sensor plates 420, which can impact the performance of the proximity sensor 270. To reduce the impact on the proximity sensor, the controller 240 can be configured to select and/or adjust one or more sensor settings and/or parameters 510 of the proximity sensor 270 as described with reference to FIG. 5.

Figure 6A:
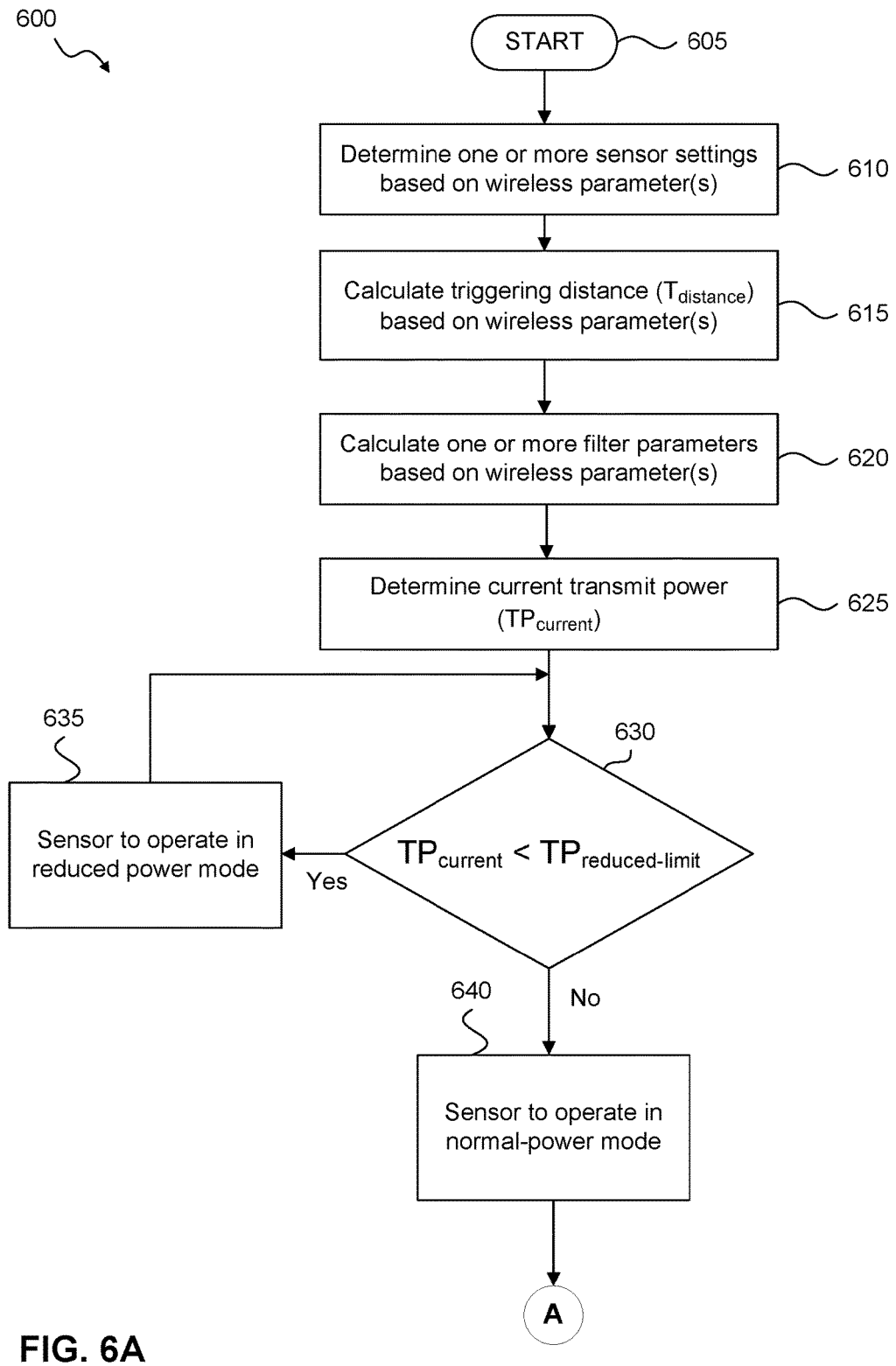
FIGS. 6A-6B illustrate a transmission power control method according to an exemplary aspect of the present disclosure.
Figure 6B:
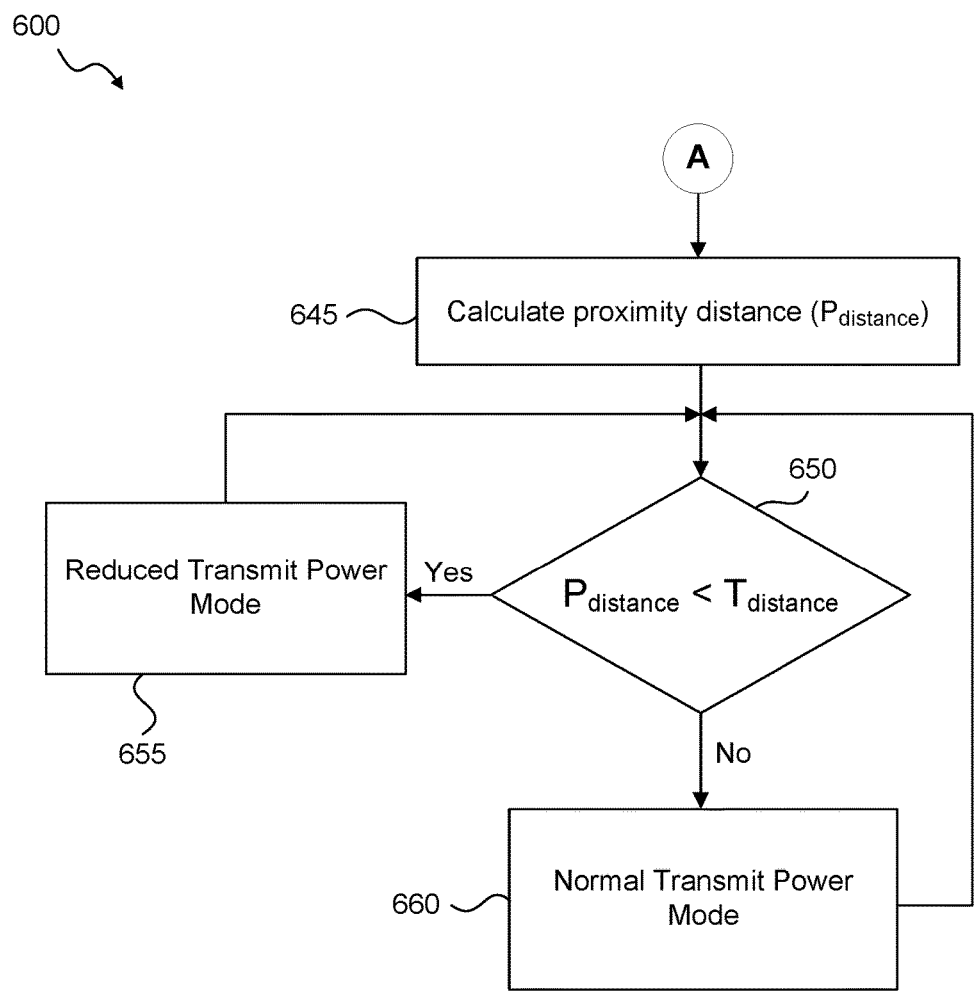

FIGS. 6A-6B illustrate a transmission power control method according to an exemplary aspect of the present disclosure. The flowchart is described with continued reference to FIGS. 1-5. The steps of the method are not limited to the order described below, and the various steps may be performed in a different order. Further, two or more steps of the method may be performed simultaneously with each other.

The method of flowchart 600 begins at step 605 and transitions to step 610, where one or more sensor settings are determined. In an exemplary aspect, the sensor settings 510 can be determined (by the controller 240) based on one or more wireless communication parameters 505, including, for example, the wireless band at which the mobile device 140 is operating, the wireless channel, the radio access technology (RAT) being used, and/or the modulation scheme.

The sensor settings and/or parameters 510 can include, for example, one or more sensitivity settings, sampling rates, noise filtering settings, and/or one or more other sensor settings/parameters as would be understood by one of ordinary skill in the relevant arts.

After step 610, the method of flowchart 600 transitions to step 615, where one or more triggering distances are calculated. In an exemplary aspect, the controller 240 calculates the triggering distance ($T_{distance}$) 520 based on one or more wireless communication parameters, including, for example, the wireless band at which the mobile device 140 is operating, the wireless channel, the radio access technology (RAT) being used, and/or the modulation scheme.

After step 615, the method of flowchart 600 transitions to step 620, where one or more filter settings and/or parameters are calculated. In an exemplary aspect, the controller 240 calculates one or more filter settings and/or parameters 530 based on one or more wireless communication parameters, including, for example, the wireless band at which the mobile device 140 is operating, the wireless channel, the radio access technology (RAT) being used, and/or the modulation scheme.

The filter settings and/or parameters 530 can include, for example, one or more filter-mode settings (e.g., low-pass, high-pass, band-pass, band-stop, comb, notch, etc.), frequency value and/or ranges, transfer functions, and/or one or more other filter settings/parameters as would be understood by one of ordinary skill in the relevant arts.

After step 620, the method of flowchart 600 transitions to step 625, where the current transmission power of the mobile device 140 is calculated. In an exemplary aspect, the controller 240 can calculate the current transmission power ($TP_{current}$) of the mobile device 140. For example, the controller 240 can calculate the transmission power $TP_{current}$ at which the transceiver 200 (i.e., the transmitter 210) wirelessly transmits.

After step 625, the method of flowchart 600 transitions to step 630, where the current transmission power ($TP_{current}$) is compared (by the controller 240) to a reduced transmission power value ($TP_{reduced-limit}$). In an exemplary aspect, the reduced transmission power value ($TP_{reduced-limit}$) is a maximum transmission power at which the mobile device 140 transmits when the mobile device 140 is operating in a reduced transmit power mode. For example, if the controller 240 determines that the proximity distance ($P_{distance}$) is less than the triggering distance ($T_{distance}$) (Step 650 below), the controller 240 can reduce the transmission power of the mobile device 140 to be at or below reduced transmission power value ($TP_{reduced-limit}$) so as to operate in a reduced transmit power mode. Reduced and normal transmission power values can be determined based on or more calibration procedures, for example.

If the controller 240 determines that the current transmission power ($TP_{current}$) is less than the reduced transmission power value ($TP_{reduced-limit}$) (YES at Step 630), the flowchart 600 transitions to step 635, where the proximity sensor 270 enters and operates in a reduced power (e.g., low-powered) operating mode. In an exemplary aspect, when operating in the reduced powered operating mode, the proximity sensor 270 or one or more components of the proximity sensor 270 can, for example, reduce its power consumption or power off.

In this example, because the current transmission power ($TP_{current}$) is less than the reduced transmission power value ($TP_{reduced-limit}$), the mobile device 140 will be in compliance with the SAR limits regardless of its proximity to, for example, the user of the mobile device 140. Therefore, to reduce power consumption, the proximity sensor 270 can operate in the low-powered operating mode because the proximity determination is not needed to determine if the mobile device 140 is in SAR compliance.

If the controller 240 determines that the current transmission power ($TP_{current}$) is greater than the reduced transmission power value ($TP_{reduced-limit}$) (NO at Step 630), the flowchart 600 transitions to step 640, where the proximity sensor 270 operates in a normal (non-reduced) powered operating mode. In this example, the mobile device 140 can use the proximity sensor 270 to determine the proximity of, for example, the user of the mobile device 140 to control the transmission power level to maintain SAR compliance.

After step 640, the method of flowchart 600 transitions to step 645, where the proximity distance ($P_{distance}$) is calculated. In an exemplary aspect, the proximity distance ($P_{distance}$) is the calculated distance between the mobile device 140 and an object (e.g., the user of the mobile device 140). In an exemplary aspect, the controller 240 can calculate a proximity distance ($P_{distance}$) to an object based on proximity information provided by the proximity sensor 270. In another exemplary aspect, the proximity sensor 270 calculates the proximity distance ($P_{distance}$) and provides the proximity distance ($P_{distance}$) to the controller 240 for processing.

After step 645, the method of flowchart 600 transitions to step 650, where the proximity distance ($P_{distance}$) is compared to the triggering distance (T distance) to adjust the transmission power of the mobile device 140. In an exemplary aspect, the controller 240 compares the proximity distance ($P_{distance}$) to the triggering distance ($T_{distance}$).

If the proximity distance ($P_{distance}$) is less than the triggering distance ($T_{distance}$) (YES at step 650), the flowchart transitions to Step 655, where the mobile device 140 enters and operates in a reduced transmit power mode. In a reduced transmit power mode, the controller 240 reduces the transmission power of the mobile device 140 so as be at or below a reduced transmission power value ($TP_{reduced-limit}$). In this example, because the mobile device 140 is within close proximity with, for example, the user of the mobile device 140 (i.e., the mobile device 140 is within the triggering distance), the transmission power is reduced to be at or below the reduced transmission power value ($TP_{reduced-limit}$) so to comply with SAR limits. After Step 655, the flowchart 600 returns to step 650.

If the proximity distance ($P_{distance}$) is greater than the triggering distance ($T_{distance}$) (NO at step 650), the flowchart transitions to Step 660, where the mobile device 140 enters and operates in a normal transmit power mode. In an exemplary aspect, the flowchart can transition to Step 660 if the proximity distance ($P_{distance}$) is greater than or equal to the triggering distance ($T_{distance}$). In a normal transmit power mode, the controller 240 adjust the transmission power of the mobile device 140 so as be at or below normal transmission power levels. In an exemplary aspect, normal transmission power levels are transmission levels in compliance with one or more wireless regulations, such as those defined by one or more wireless standards, as well as in compliance with SAR limits. In an exemplary aspect, a normal transmission power level is greater than a corresponding reduced transmission power level (e.g., $TP_{reduced-limit}$) for the same or similar wireless communication parameters at which the mobile device 140 is operating. After Step 660, the flowchart 600 returns to step 650.

EXAMPLES

Example 1 is a transmission power control method for a communication device, comprising: calculating a triggering distance based on one or more communication parameters; calculating, using a proximity sensor, a proximity distance of the communication device with an external object; comparing the triggering distance and the proximity distance; and setting a transmission power mode of the communication device based on the comparison.

In Example 2, the subject matter of Example 1, wherein setting the transmission power mode comprises: controlling the communication device to operate in a reduced transmission power mode if the proximity distance is less than the triggering distance; and controlling the communication device to operate in a non-reduced transmission power mode if the proximity distance is greater than the triggering distance.

In Example 3, the subject matter of Example 2, further comprising: limiting a transmission power at which the communication device transmits when operating in the reduced transmission power mode.

In Example 4, the subject matter of Example 3, wherein limiting the transmission power comprises limiting the transmission power to be less than a reduced transmission power value, the communication device being operable to exceed the reduced transmission power value when operating in the non-reduced transmission power mode.

In Example 5, the subject matter of Example 1, wherein the one or more communication parameters comprise at least one of: a wireless communication band at which the communication device is wirelessly communicating; a wireless channel at which the communication device is wirelessly communicating; a radio access technology (RAT) at which the communication device is wirelessly communicating; and a modulation scheme at which the communication device is wirelessly communicating.

In Example 6, the subject matter of Example 1, further comprising: adjusting one or more sensor settings of the proximity sensor based on the one or more communication parameters.

In Example 7, the subject matter of Example 1, further comprising: determining a current transmission power value at which the communication device is wirelessly communicating; determining a reduced transmission power value based on the one or more communication parameters; comparing the current transmission power value and the reduced transmission value; and controlling the proximity sensor to operate in a reduced power mode based on the comparison.

In Example 8, the subject matter of Example 7, wherein the reduced transmission power value is a maximum transmission power at which the communication device transmits when operating in a reduced transmission power mode, the maximum transmission power being determined based on the one or more communication parameters.

In Example 8, the subject matter of Example 1, wherein the proximity sensor is a capacitance sensor configured to measure a capacitance.

Example 10 is a communication device, comprising: a proximity sensor configured to calculate a proximity distance between the communication device and an external object; and a controller configured to: calculate a triggering distance based on one or more communication parameters; compare the triggering distance and the proximity distance; and set a transmission power mode of the communication device based on the comparison.

In Example 11, the subject matter of Example 10, wherein, to set the transmission power mode, the controller is configured to: control the communication device to operate in a reduced transmission power mode if the proximity distance is less than the triggering distance; and control the communication device to operate in a non-reduced transmission power mode if the proximity distance is greater than the triggering distance In Example 12, the subject matter of Example 11, wherein the controller is further configured to: limit a transmission power at which the communication device transmits when operating in the reduced transmission power mode.

In Example 13, the subject matter of Example 12, wherein, to limit the transmission power, the controller is configured to: limit the transmission power to be less than a reduced transmission power value, the communication device being operable to exceed the reduced transmission power value when operating in the non-reduced transmission power mode.

In Example 14, the subject matter of Example 10, wherein the one or more communication parameters comprise at least one of: a wireless communication band at which the communication device is wirelessly communicating; a wireless channel at which the communication device is wirelessly communicating; a radio access technology (RAT) at which the communication device is wirelessly communicating; and a modulation scheme at which the communication device is wirelessly communicating.

In Example 15, the subject matter of Example 10, wherein the controller is further configured to: adjust one or more sensor settings of the proximity sensor based on the one or more communication parameters.

In Example 16, the subject matter of Example 10, wherein the controller is further configured to: determine a current transmission power value at which the communication device is wirelessly communicating; determine a reduced transmission power value based on the one or more communication parameters; comparing the current transmission power value and the reduced transmission value; and controlling the proximity sensor to operate in a reduced power mode based on the comparison.

In Example 17, the subject matter of Example 16, wherein the reduced transmission power value is a maximum transmission power at which the communication device transmits when operating in a reduced transmission power mode, the maximum transmission power being determined based on the one or more communication parameters.

In Example 18, the subject matter of Example 10, wherein the proximity sensor is a capacitance sensor configured to measure a capacitance.

Example 19 is a transmission power control method for a communication device, comprising: calculating a triggering distance based on one or more communication parameters; calculating, using a proximity sensor, a proximity distance of the communication device with an external object; comparing the triggering distance and the proximity distance; and controlling, based on the comparison, the communication device to operate in a reduced transmission power mode to limit a transmission power at which the communication device transmits to a reduced transmission power value, the communication device being operable to exceed the reduced transmission power value when operating in a non-reduced transmission power mode.

In Example 20, the subject matter of Example 19, wherein controlling the communication device to operate in the reduced transmission power mode comprises controlling the communication device to operate in the reduced transmission power mode if the proximity distance is less than the triggering distance.

In Example 21, the subject matter of Example 20, further comprising: controlling the communication device to operate in the non-reduced transmission power mode if the proximity distance is greater than the triggering distance.

Example 22 is a communication device, comprising: a proximity sensor means for calculating a proximity distance between the communication device and an external object; and a controlling means for: calculating a triggering distance based on one or more communication parameters; comparing the triggering distance and the proximity distance; and setting a transmission power mode of the communication device based on the comparison.

In Example 23, the subject matter of Example 22, wherein, to set the transmission power mode, the controlling means: controls the communication device to operate in a reduced transmission power mode if the proximity distance is less than the triggering distance; and controls the communication device to operate in a non-reduced transmission power mode if the proximity distance is greater than the triggering distance.

In Example 24, the subject matter of Example 23, wherein the controlling means: limits a transmission power at which the communication device transmits when operating in the reduced transmission power mode.

In Example 25, the subject matter of Example 24, wherein, to limit the transmission power, the controlling means: limits the transmission power to be less than a reduced transmission power value, the communication device being operable to exceed the reduced transmission power value when operating in the non-reduced transmission power mode.

In Example 26, the subject matter of Example 22, wherein the one or more communication parameters comprise at least one of: a wireless communication band at which the communication device is wirelessly communicating; a wireless channel at which the communication device is wirelessly communicating; a radio access technology (RAT) at which the communication device is wirelessly communicating; and a modulation scheme at which the communication device is wirelessly communicating.

In Example 27, the subject matter of Example 22, wherein the controlling means: adjusts one or more sensor settings of the proximity sensor based on the one or more communication parameters.

In Example 28, the subject matter of Example 22, wherein the controlling means: determines a current transmission power value at which the communication device is wirelessly communicating; determines a reduced transmission power value based on the one or more communication parameters; compares the current transmission power value and the reduced transmission value; and controls the proximity sensor means to operate in a reduced power mode based on the comparison.

In Example 29, the subject matter of Example 28, wherein the reduced transmission power value is a maximum transmission power at which the communication device transmits when operating in a reduced transmission power mode, the maximum transmission power being determined based on the one or more communication parameters.

In Example 30, the subject matter of Example 22, wherein the proximity sensor means is a capacitance sensor configured to measure a capacitance.

Example 31 is an apparatus comprising means to perform the method as described in any of Examples 1-9 and 19-21.

Example 32 is a computer program product embodied on a computer-readable medium comprising program instructions that when executed, causes a processor to perform the method of any of Examples 1-9 and 19-21.

Example 33 is an apparatus substantially as shown and described.

Example 34 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE), and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A transmission power control method for a communication device, comprising:
    determining a triggering distance based on one or more communication parameters;
    controlling a proximity sensor to determine a proximity distance of the communication device with an external object;
    comparing the triggering distance and the proximity distance;
    selecting a transmission power mode of the communication device from a non-reduced transmission power mode and a reduced transmission power mode based on the comparison of the proximity distance and the triggering distance, wherein a transmission power of the communication device operating in the reduced transmission power mode is limited to a reduced transmission power value determined based on the one or more communication parameters;
    determining a transmission power value at which the communication device is wirelessly communicating; and
    controlling the proximity sensor to operate in a reduced power mode based on a comparison of the transmission power value and the reduced transmission power value, wherein the proximity sensor operates in the reduced power mode in response to the transmission power value being less than the reduced transmission power value.

2. The transmission power control method of claim 1, wherein selecting the transmission power mode comprises:
    controlling the communication device to operate in the reduced transmission power mode if the proximity distance is less than the triggering distance; and
    controlling the communication device to operate in the non-reduced transmission power mode if the proximity distance is greater than the triggering distance.

3. The transmission power control method of claim 2, wherein the communication device is operable to exceed the reduced transmission power value when operating in the non-reduced transmission power mode.

4. The transmission power control method of claim 1, wherein the one or more communication parameters comprise at least one of:
   a wireless communication band at which the communication device is wirelessly communicating;
   a wireless channel at which the communication device is wirelessly communicating;
   a radio access technology (RAT) at which the communication device is wirelessly communicating; and
   a modulation scheme at which the communication device is wirelessly communicating.

5. The transmission power control method of claim 1, further comprising:
   adjusting one or more sensor settings of the proximity sensor based on the one or more communication parameters.

6. The transmission power control method of claim 1, wherein the reduced transmission power value is a maximum transmission power at which the communication device transmits when operating in the reduced transmission power mode, the maximum transmission power being determined based on the one or more communication parameters.

7. The transmission power control method of claim 1, wherein the proximity sensor is a capacitance sensor configured to measure a capacitance.

8. A communication device, comprising:
   a proximity sensor configured to determine a proximity distance between the communication device and an external object; and
   a controller configured to:
     determine a triggering distance based on one or more communication parameters;
     compare the triggering distance and the proximity distance;
     select a transmission power mode of the communication device from a non-reduced transmission power mode and a reduced transmission power mode based on the comparison of the proximity distance and the triggering distance, wherein a transmission power of the communication device operating in the reduced transmission power mode is limited to a reduced transmission power value determined based on the one or more communication parameters; and
     determine a transmission power value at which the communication device is wirelessly communicating; and
     control the proximity sensor to operate in a reduced power mode based on a comparison of the transmission power value and the reduced transmission power value, wherein the proximity sensor operates in the reduced power mode in response to the a transmission power value being less than the reduced transmission power value.

9. The communication device of claim 8, wherein, to switch the transmission power mode, the controller is configured to:
   control the communication device to operate in the reduced transmission power mode if the proximity distance is less than the triggering distance; and
   control the communication device to operate in the non-reduced transmission power mode if the proximity distance is greater than the triggering distance.

10. The communication device of claim 9, wherein, the communication device is operable to exceed the reduced transmission power value when operating in the non-reduced transmission power mode.

11. The communication device of claim 8, wherein the one or more communication parameters comprise at least one of:
    a wireless communication band at which the communication device is wirelessly communicating;
    a wireless channel at which the communication device is wirelessly communicating;
    a radio access technology (RAT) at which the communication device is wirelessly communicating; and
    a modulation scheme at which the communication device is wirelessly communicating.

12. The communication device of claim 8, wherein the controller is further configured to:
    adjust one or more sensor settings of the proximity sensor based on the one or more communication parameters.

13. The communication device of claim 8, wherein the reduced transmission power value is a maximum transmission power at which the communication device transmits when operating in the reduced transmission power mode, the maximum transmission power being determined based on the one or more communication parameters.

14. The communication device of claim 8, wherein the proximity sensor is a capacitance sensor configured to measure a capacitance.

15. A transmission power control method for a communication device, comprising:
    calculating a triggering distance based on one or more communication parameters;
    calculating, using a proximity sensor, a proximity distance of the communication device with an external object;
    comparing the triggering distance and the proximity distance;
    controlling, based on the comparison, the communication device to operate in a reduced transmission power mode to limit a transmission power at which the communication device transmits to a reduced transmission power value determined based on the one or more communication parameters, the communication device being operable to exceed the reduced transmission power value when operating in a non-reduced transmission power mode;
    determining a transmission power value at which the communication device is wirelessly communicating; and
    controlling the proximity sensor to operate in a reduced power mode based on a comparison of the transmission power value and the reduced transmission power value, wherein the proximity sensor operates in the reduced power mode in response to the transmission power value being less than the reduced transmission power value.

16. The transmission power control method of claim 15, wherein controlling the communication device to operate in the reduced transmission power mode comprises controlling the communication device to operate in the reduced transmission power mode if the proximity distance is less than the triggering distance.

17. The transmission power control method of claim 16, further comprising:

controlling the communication device to operate in the non-reduced transmission power mode if the proximity distance is greater than the triggering distance.

\* \* \* \* \*